United States Patent Office 2,794,040
Patented May 28, 1957

2,794,040

PROCESS FOR PREPARING OXIDIZED MICRO-CRYSTALLINE WAXES

Weldon G. Annable, Mundelein, and John W. Walsh, Crystal Lake, Ill., assignors to The Pure Oil Company, Chicago, Ill., a corporation of Ohio No Drawing. Application July 27, 1955,
Serial No. 524,806

3 Claims. (Cl. 260—452)

The present invention relates to oxidized microcrystalline waxes and to a method of preparing the same. More particularly, this invention is concerned with the preparation of a hard oxidized microcrystalline wax and a soft oxidized microcrystalline wax from stock obtained in the dewaxing of bright stock.

Microcrystalline wax has a finer, less apparent crystalline structure than paraffin wax and comprises a solid hydrocarbon mixture of a molecular weight averaging higher than that of paraffin wax. Microcrystalline waxes possess plastic properties and are obtainable from crude petroleum fractions commonly designated as heavy lubricating and cylinder oil stocks. Petrolatum wax is the term applied to microcrystalline wax refined from heavy petrolatum stock. It is usually of a sticky nature with about 155-165° F. melting point and a penetration value of more than about 30. Microcrystalline waxes of lower oil content than petrolatum wax are generally of higher melting point, that is, 170° F. to 195° F., and in some cases up to 200° F. melting point. All microcrystalline waxes are of about the same molecular weight and are said to be composed of hydrocarbon chains of twice the length of those of the paraffin waxes. Microcrystalline waxes have been used to advantage as adhesives, coating agents, and for other commercial purposes.

The properties of microcrystalline waxes have in the past been altered to produce new and useful products by the addition to the waxes of various foreign materials, such as resins, rubber, polymers, other types of waxes, oils and the like. Frequently, the foreign materials have been found to be difficult to blend with the waxes, expensive, or otherwise unsatisfactory.

Microcrystalline waxes have also been subjected to chemical treatments of various types, such as ozonization, chlorination and oxidation to vary their chemical structures and physical properties. A particularly suitable type of oxidized microcrystalline wax, for example, has been prepared for use as an extender for carnauba wax, in emulsion-type floor and car polishes, and in the manufacture of crayons, inks, coating compositions and the like, by liquid phase catalytic oxidation of tank-bottoms wax. When wax-bearing crude petroleum oil is stored in storage tanks for a considerable period of time, microcrystalline-type tank-bottom wax may be recovered from the material settling out of the oil and depositing on the bottom of the storage tanks. A hard oxidized wax product with a melting point of about 190° F. can be made from these bottoms with an acid number in the range of about 10-30 and a saponification number in the range of 40-80. The oxidized tank-bottoms wax is characterized by hardness up to the melting point, and may exhibit a penetration at 77° F. of about 4-7. These penetration values and those hereinafter described in this specification refer to penetrations as determined according to the A. S. T. M. method D5-52. The conditions under which all penetration values were determined were a load of 100 grams for 5 seconds at 25° C. The units of penetration indicate hundredths of a centimeter. These are the standard conditions set forth in the above-designated A. S. T. M. method.

The tank-bottoms wax as a source of material for the preparation of oxidized wax of the above-described desired characteristics has the disadvantage of being relatively expensive due to the limited supply available for use and sale. Substitution of other microcrystalline waxes as starting materials has not proven successful in attempts to duplicate the desired oxidized tank-bottoms waxes. For example, if microcrystalline wax from the dewaxing of wax-bearing petroleum lubricating oil fractions in the preparation of bright stick is oxidized by catalytic, liquid-phase oxidation, the oxidized products have a melting point of about 160° F. or less and are relatively soft, showing a penetration at 77° F. of 20 or more. Hence, these oxidized products cannot be substituted for the oxidized tank-bottoms waxes.

U. S. Patent 2,636,004 (R. G. Capell, W. D. Ridenour and J. A. Stewart, April 21, 1953), for example, points out that besides the formation of objectionable odors and an increase in color and acidity, oxidation of wax brings about a lowering of melting point and tensile strength, and an overall deterioration of valuable properties, such as hardness and the like, of the wax. Warth, Albin H., in "The Chemistry & Technology of Waxes," 1947, page 256, states that oxidation of microcrystalline wax lowers the melting point of the wax.

Hardness up to a high melting point is essential where a wax is to extend or substitute for carnauba wax, an expensive, high-melting-point (about 186° F.) vegetable wax, exhibiting a high softening point and great hardness. Carnauba wax maintains a high luster over a long period of time when it is a main wax constituent of floor and car polishes and the like. Oxidized tank-bottoms wax may be substituted for at least a portion of carnauba wax in commercial preparations, but the physical characteristics of other oxidized microcrystalline waxes obviate their use as a carnauba wax extender or substitute.

Unexpectedly, we have found that if we prepare oxidized microcrystalline wax in a certain manner and further treat the oxidized wax, we are able to produce a wax product comparable in physical characteristics to oxidized tank-bottoms wax and much less expensive. Moreover, we also obtain a soft, oxidized microcrystalline wax product which is suitable for use in various soluble oil formulations. Our process utilizes inexpensive feed material and produces two different waxes of definite commercial importance.

Accordingly, it is an object of our invention to provide a carnauba wax extender and a method of preparing the same.

It is also an object of our invention to provide a method of preparing a hard, high-melting-point, oxidized, microcrystalline wax.

It is also an object of our invention to provide a method of preparing a soft, low-melting-point, oxidized, microcrystalline wax.

It is a further object of our invention to produce a high-melting-point, hard, oxidized wax from an inexpensive feed in an inexpensive manner.

It is a still further object of our invention to provide both a high-melting-point, high-softening-point, carnauba-extending, oxidized, microcrystalline wax, and a soft, oxidized, microcrystalline wax from microcrystalline wax obtained during the dewaxing of petroleum crude oil fractions in the preparation of bright stocks, by a simple, economical process.

Other objects, advantages and uses of our invention will be apparent from a study of this specification and accompanying claims.

We have found that if liquid-phase, catalytic oxidation is conducted on microcrystalline waxes obtained during the dewaxing steps in the preparation of bright stock lubricating fractions from wax-bearing petroleum hydrocarbon oil, an oxidized product is obtained which may be separated into two distinct, oxidized, wax fractions of radically different characteristics by a suitable solvent extraction and low-temperature precipitation step. According to the teachings of the prior art, it would be expected that the treatment with the solvent would serve to divide the product into oxidized and unoxidized fractions, as seen, for example, in U. S. Patent 2,410,642 (A. Farkas and A. F. Strubley, Jr., November 5, 1946). Each of the two wax fractions we obtained, however, showed a considerable degree of oxidation, as evidenced by their saponification and acid numbers.

In general, therefore, our invention comprises an oxidized, high-melting-point, hard, microcrystalline wax; a soft, low-melting-point, oxidized, microcrystalline wax; and a process for simultaneously preparing these two waxes.

More particularly, our invention covers a multi-step process comprising liquid-phase, catalytic oxidation of microcrystalline wax obtained from the dewaxing steps in the preparation of bright stock lubricating fractions from wax-bearing petroleum hydrocarbon oil, followed by solution of the oxidized product in a suitable solvent; precipitation under refrigeration therefrom a hard, high-melting-point, high softening-point, oxidized, microcrystalline wax; separation of the precipitate, and evaporation of the solvent from the dissolved wax; and recovery of a soft, low-melting-point, oxidized wax. Our invention also particularly relates not only to the process of preparation but the products themselves.

The microcrystalline wax which is the starting material in the process of our invention may be obtained from a Mid-Continent crude or from any other non-Pennsylvania-type, wax-bearing petroleum crude oils. In the process of refining the wax-bearing crude oil, the oil is divided into a number of fractions, including a neutral lubricating oil fraction and a cylinder stock, or residuum. From the residumm the microcrystalline wax may be derived.

The residuum or cylinder stock is usually, though not necessarily, first deasphalted by propane or other suitable solvent and then either acid-treated with sulfuric acid to remove aromatic and naphthenic hydrocarbons, or solvent-refined with phenol, sulfur dioxide, or other suitable solvent to extract the undesirable aromatic and naphthenic hydrocarbons. With low aromatic and low naphthenic content crude oils, the acid refining or solvent treating may be eliminated.

Another step in the processing of the residuum comprises dewaxing, which may be performed by any one of a number of suitable processes, including low-temperature crystallization from a solvent-oil solution followed by separation by centrifugation. Solvent dewaxing may employ any one of a number of suitable solvents or solvent mixtures, or solvent-antisolvent mixtures, e. g., propane, or a mixture of methyl ethyl ketone and toluene in a ratio of solvent mixture-to-oil of about 1:1 to 4:1, depending upon the nature and viscosity of the charge stock. In a typical operation, after suitable contact of solvent with the oil fraction, rich solvent containing dissolved oil is separated from the wax by a suitable means, such as a settling tank, filtration, or centrifuging, after which the residue solvent is removed from the wax by the application of heat and/or reduced pressure, and the wax is obtained in relatively pure solid form. The characteristics of the microcrystalline wax at this stage in the processing depend somewhat upon the concentration of oil entrained therein.

Generally, wax is obtained with a relatively large oil content so that the wax has a low melting point and is tacky. This wax is classified as the petrolatum type. The oil content of the microcrystalline wax before its use in the process of our invention is usually further decreased in a de-oiling step to bring it to a value of about 0.7% or less in order to obtain commercially-used, microcrystalline wax of general characteristics listed in Table I below:

TABLE I

| | |
|---|---|
| NPA Color | 2 |
| M. P., ° F. | 180 |
| Percent oil | 0.6 |
| Penetration at 77° F. | 17 |
| Flash, C. O. C. | 590° F. |
| Fire, C. O. C. | 635° F. |
| Gravity at 190° F. | 45.0 |
| Viscosity at 210° F. | 88.4 |

The de-oiling step may be accomplished by any appropriate means, such as pressing to squeeze the oil out or by the application of heat and/or reduced pressure. Preferably, a second solvent extraction is performed under conditions similar to those of the dewaxing step, except for higher temperatures, such as 45° F. The wax, for example, may be precipitated from the solvent solution by chilling, and removed by centrifugation; or, the suspension containing the wax may be filtered to remove solvent and oil therefrom to produce purified, de-oiled, microcrystalline wax.

The de-oiling step may be eliminated in the preparation of the feed stock for our process, but it is preferred that it be included if the oil content of the wax is higher than about 10% by weight.

For purposes of clarity, the microcrystalline wax used as feed material in our process and prepared as above-described is termed "microcrystalline wax derived in the production of bright stock" and is referred to in the appended claims in such a manner. If desired, the wax may be bleached by contacting it in a conventional manner with fullers earth, or by other known types of such bleaching.

As the first step in the process of our invention, the microcrystalline wax feed, obtained substantially as above-described, is oxidized in a vessel, such as a closed or open kettle, in liquid phase at 280° F. to 330° F., preferably 280–300° F., either in the presence of a suitable catalyst or without a catalyst. The catalyst may be an oil-soluble salt of certain organic acids, such as the naphthenate, acetate, oleate, stearate, propionate, and butyrate salts of lithium, sodium, potassium, calcium strontium aluminum, barium, nickel, iron, cobalt, manganese, copper, zinc, molybdenum, vanadium, tungsten or chromium. The catalyst may instead be the oil-soluble salt formed in situ in the wax from metal oxides such as those of vanadium, tungsten, chromium, molybdenum, manganese, iron, nickel, copper, zinc and cobalt. Manganese stearate is a preferred catalyst. Mixtures of two or more catalysts are also contemplated. Preferably a catalyst promoter is used with the catalyst. The promoter may comprise an oxide of an alkaline earth metal, most preferably magnesium oxide. Mixtures of two or more promoters with one or more catalysts are also contemplated. Thus, a suitable catalyst-promoter combination may be manganese stearate and magnesium oxide. Another suitable combination is lithium stearate and magnesium oxide. Also suitable for use with magnesium oxide are lithium hydroxy stearate, calcium stearate and cobalt stearate, as well as cobalt oleate and manganese oleate. The catalyst is employed in a concentration of about 0.1% to 2.0%, by weight of feed, preferably in about 1% by weight when utilized with a small amount of promoter such as 0.01–0.5% by weight, preferably about 0.05%–0.1% by weight.

During the reaction period, oxygen or air is bubbled through the reaction mixture at any effective rate, such as 1 liter per minute of substantially pure oxygen/400 grams of wax feed. The feed rate may vary, for example, between 0.1 to 4.0 liters per minute of oxygen per 1000 grams of wax. The reaction is carried on for 2 to 40 hours, depending on the temperature utilized, amounts of catalyst and promoter present, and rate of introduction of oxygen or air per unit of feed treated. For example, when a 400 gram sample of microcrystalline wax was oxidized with 1 liter/minute of oxygen at 300° F., in the presence of 1% by weight of manganese stearate and 0.05% by weight of magnesium oxide, over a period of 7 hours, an oxidized product of about 169.4° F. melting point, 34 saponification number and 15 acid number was obtained. The oxidation may be discontinued any time after the saponification number and acid number reach at least about 40 and 10, respectively, or when the oxidation has proceeded sufficiently to provide an ultimate, hard, wax fraction of about 6–8 penetration. Oxidation beyond this point increases both acid number and saponification number without greatly varying the ratio between them, or radically affecting the melting point and penetration value of the oxidized product, and, hence, the oxidation may be continued for some time thereafter without otherwise deleteriously affecting the oxidized product. For example, the above-mentioned oxidized product at 7 hours had 169.4° F. melting point and 17.0 penetration at 77° F., while at 14 hours the values were 163.7° F. and 19.1; at 21 hours, the values were 161.3° F. and 19.8; while at 28 hours they were 161.0° F. and 20.7.

On completion of the oxidation step of our process, the reaction mixture is cooled to about 150–200° F. The catalyst and promoter combination may be separated from the oxidized product by decanting, filtering, centrifuging, etc., and as the second major step of our process, the oxidized product is mixed in a suitable vessel, such as an open kettle, with 1–20 volumes, preferably about 10 volumes, of a particular anti-solvent, such as methyl ethyl ketone, alone or with a wax solvent such as toluene (e. g., 66% by volume of methyl ethyl ketone and 33% toluene), or low-boiling aromatics. Suitable solvent-antisolvent combinations which may be used are methyl ethyl ketone-benzene mixtures or methyl isopropyl ketone-toluene mixtures. After thorough mixing of the solvent or solvent-antisolvent mixture with the oxidized product to dissolve the same, the temperature of the mixture is reduced sufficiently to bring about precipitation. This temperature is usually between about −10° F. and +10° F. A hard, oxidized wax portion precipitates out of solution. After allowing a suitable interval to assure complete precipitation and settling, the precipitate is then removed by decanting, filtering, centrifuging, or other available means, and is dried free of solvent. The percipitation also may be carried out in two steps, if desired, to obtain two fractions of hard wax, which then may be used separately or may be composited to form a desired product. In this stepwise percipitation, one fraction is precipitated at 35° to 50° F., and the other fraction at −10° to +10° F. The unprecipitated wax in solution is recovered from the solvent by conventional means, such as solvent stripping by heat, selective adsorption, etc. The precipitated wax on analysis is found to be high melting, hard, and of low penetration value, while the wax recovered by removal of the solvent by stripping or other means is low in melting point, has a high penetration value, and is soft and sticky.

The following examples further illustrate the process of our invention:

*Example I*

A microcrystalline wax, obtained by dewaxing bright stock from Mid-Continent-type crude oil, in 250 gram amounts and having the following initial values:

Melting point ° F_____ 176.7
Penetration at 77° F_____ 18
Saponification No_____ <0.03
Acid No_____ <0.03 was oxidized in a two-liter, three-necked flask for 5.5 hrs. with a flow rate of 0.5 cubic foot of substantially pure oxygen/minute, the oxygen being bubbled up through the melted wax. The reaction temperature was 300–350° F. and the catalyst was 1% by weight of manganese stearate promoted with 0.1% by weight of magnesium oxide. At the end of the 5.5 hours reaction period, the product had a saponification number of 81 and an acid number of 31. The oxidized material was filtered free of the catalyst-promoter combination, heated to about 150° F. temperature in a separate system, and a mixture of methyl ethyl ketone (66% by volume) and toluene (33% by volume) was added to the oxidized wax with mixing until the volume ratio of solvent-antisolvent wax was 10:1. The solvent-antisolvent mixture containing the dissolved, oxidized wax was cooled to about −6° F. and a wax precipitated out. The solution was filtered from the precipitate, and the precipitate was dried free of solvent and recovered as product A. The solvent-antisolvent combination was then stripped by vacuum distillation from the dissolved wax remaining in solution to recover product B. The characteristics of the various fractions appear below:

| Description | Oxidized Product Before Solvent Treating | Product A | Product B |
|---|---|---|---|
| Melting point, ° F | 163 | 167.0 | 129.0 |
| Penetration at 77° F | 23 | 8 | 23 |
| Sap. No | 81 | 68 | 10.9 |
| Acid No | 31 | 21 | 4.2 |
| Percent Recovery | 100 | 60 | 40 |

*Example II*

The same procedure was followed as in Example I, except that 561.1 grams of microcrystalline wax of the following characteristics was charged, and the oxygen was 1 liter per minute.

Melting point ° F_____ 177
Penetration at 77° F_____ 18
Saponification No_____ <0.03
Acid No_____ <0.03

Also, the oxidized product was treated with methyl ethyl ketone, instead of the methyl ethyl ketone-toluene mixture, using a volume ratio of solvent to wax of 10:1. The characteristics of the various fractions appear below:

| Description | Oxidized Product Before Solvent Treating | Product A | Product B |
|---|---|---|---|
| Melting point, ° F | 160 | 161.8 | 95.4 |
| Penetration at 77° F | 26 | 12 | 23 |
| Saponification No | 77 | 68 | 154 |
| Acid No | 47 | 30 | 85 |
| Percent Recovery | | 73.2 | 26.8 |

It is seen from a comparison of the above examples, such as product A of Example I, with the characteristics given below on an oxidized wax prepared from tank bottoms, that the oxidized bottoms wax and the oxidized microcrystalline wax prepared by our process are similar in hardness and penetration.

| Description | Oxidized Tank Bottoms Wax | Oxidized Wax, Example I | Product A, Example I |
|---|---|---|---|
| Melting point, ° F | 184–189 | 163 | 167 |
| Penetration at 77° F | 4–6 | 23 | 8 |
| Saponification No | 45–50 | 81 | 68 |
| Acid No | 13–15 | 31 | 21 |

Although the melting point of product A, Example I is lower than that of the oxidized tank-bottoms wax, yet the all-important penetration is sufficiently low so that product A, Example I may be substituted for the oxidized tank-bottoms wax and/or used for the same or similar purposes as mentioned above, that is, as a carnauba wax extender in making crayons, in floor and car polishes, etc. This is contrasted with the lower melting point and very high penetration value of the oxidized wax of Example I, before the second major step of our process, division into two oxidized fractions by the use of a suitable solvent. The high penetration value of the oxidized microcrystalline wax renders it useless as an oxidized bottoms wax substitute.

Thus, it is seen that controlled oxidation followed by solvent fractionation produces an oxidized microcrystalline wax fraction by sufficiently low penetration value to render it comparable in physical characteristics and possibilities of use to the scarce and more expensive oxidized tank-bottoms wax. Oxidation apparently has the effect of reducing the melting point of the wax, but increasing the peneration of a portion thereof. We have definitely shown that the second step of our process produces a separation of two oxidized fractions, one being the hard, oxidized fraction having the characteristics of oxidized tank-bottoms wax, and the other being a soft, oxidized fraction suitable for inclusion in soluble oil formulations.

Suitable modifications and changes in our process and in the equipment used in carrying out our process as are within the purview of one skilled in the art are also contemplated.

We claim and particularly point out as our invention:

1. The process of preparing an oxidized wax of low penetration comprising subjecting petroleum microcrystalline wax having an oil content below 0.7% by weight to catalytic oxidation in liquid phase at temperatures between about 280-330° F. until the wax attains a saponification number of at least 40 and an acid number of at least 10 and yields upon extraction with a solvent selected from the groups consisting of methyl ethyl ketone and methyl ethyl ketone-toluene mixture, a precipitate having a penetration of 8-10, separating the catalyst from the oxidized wax, mixing the resulting oxidized wax with sufficient solvent of the aforesaid groups to produce upon cooling to below 10° F. a precipitate and an extract, cooling the oxidized wax-solvent mixture to a temperature between about 10° F. and −10° F. and recovering the precipitate as the low penetration oxidized wax.

2. Process in accordance with claim 1 in which the microcrystalline wax has a saponification number of 81 and an acid number of 31 at the end of the oxidation step.

3. Process in accordance with claim 1 in which the microcrystalline wax has a saponification number of 77 and an acid number of 47 at the end of the oxidation step.

References Cited in the file of this patent

UNITED STATES PATENTS

| Number | Name | Date |
|---|---|---|
| 2,160,930 | Whiteley et al. | June 6, 1939 |
| 2,229,658 | Jenkins | Jan. 28, 1941 |
| 2,249,708 | Hicks-Bruun | July 15, 1941 |
| 2,265,948 | Loder | Dec. 9, 1941 |
| 2,274,057 | Gerlicher | Feb. 24, 1942 |
| 2,682,553 | Kirk et al. | June 29, 1954 |
| 2,698,336 | Nelson | Dec. 28, 1954 |
| 2,700,050 | Riethof et al. | Jan. 18, 1955 |